United States Patent [19]
Johnson et al.

[11] Patent Number: 4,818,589
[45] Date of Patent: Apr. 4, 1989

[54] PAINT TRANSFER ARTICLE AND METHODS OF PREPARATION AND USE THEREOF

[75] Inventors: Bruce E. Johnson, White Bear Lake; Max Naglosky, III, St. Paul, both of Minn.

[73] Assignee: Minnesota Mining and Manufacturing Company, St. Paul, Minn.

[21] Appl. No.: 47,886

[22] Filed: May 8, 1987

Related U.S. Application Data

[63] Continuation-in-part of Ser. No. 818,795, Jan. 14, 1986, abandoned.

[51] Int. Cl.[4] .......................... B32B 7/02; B32B 15/08

[52] U.S. Cl. .................................... 428/201; 156/230; 156/238; 428/204; 428/207; 428/347; 428/349; 428/457; 428/913; 428/914

[58] Field of Search ................. 428/462, 914, 346, 31, 428/349, 201, 483, 204, 207, 457, 913, 347, 31; 430/541; 156/230, 238, 235

[56] References Cited

U.S. PATENT DOCUMENTS

| | | | |
|---|---|---|---|
| Re. 29,072 | 12/1976 | Zondek | 428/462 X |
| Re. 30,771 | 10/1981 | Zondek | 156/196 |
| 3,549,446 | 12/1970 | Bennett et al. | 428/914 X |
| 3,640,791 | 2/1972 | Rosenheim | 156/230 |
| 3,818,823 | 7/1983 | Boyd | 156/235 |
| 3,907,974 | 9/1975 | Smith | 428/346 |
| 3,928,710 | 12/1975 | Arnold et al. | 428/483 |
| 4,101,698 | 7/1978 | Dunning et al. | 428/31 |
| 4,263,077 | 4/1981 | Rampelberg | 156/238 |
| 4,421,839 | 12/1983 | Takiguchi et al. | 430/541 |
| 4,451,522 | 5/1984 | de Vroom | 428/201 |

FOREIGN PATENT DOCUMENTS

| | | | |
|---|---|---|---|
| WO84/03473 | 9/1984 | PCT Int'l Appl. | 156/235 |

*Primary Examiner*—Thomas J. Herbert
*Attorney, Agent, or Firm*—Donald M. Sell; Robert H. Jordan

[57] ABSTRACT

A paint transfer article useful in forming a protective or colored coating on a compound structural component. The paint transfer article comprises an optional carrier liner sequentially covered with continuous layers of a colored layer having a colored base layer and an optional clear coating, a reinforcing layer, and an optional heat-activatable adhesive. The reinforcing layer has a sufficiently low glass transition temperature and a sufficiently high tensile modulus to resist damage to itself and the colored layer upon impact or under moderate pressure. Also a method of paint transfer using the article, a method of preparing the composite, a cold-formable painted metal bank, and a method for cold-forming painted parts.

26 Claims, 2 Drawing Sheets

PAINT TRANSFER ARTICLE AND METHODS OF PREPARATION AND USE THEREOF

CROSS-REFERENCE TO RELATED APPLICATION

This is a continuation-in-part of pending patent application Ser. No. 818,795, filed Jan. 14, 1986, now abandoned.

FIELD OF THE INVENTION

This invention relates to a paint transfer article which may be used to apply a colored coating to a substrate such as the exterior surface of an automobile body panel. This invention further relates to methods of preparation and use of such an article.

BACKGROUND OF THE INVENTION

Many articles of manufacture have structural components, the exterior surfaces of which define a compound surface, for example, automobile door panels, fenders, hoods, and the like. The exterior surfaces of these compound structural components have been painted by various techniques in order to apply a protective and decorative coating thereto. There have been improvements made in the paints and in the application equipment, yet the basic features of the commercially used processes remain essentially unchanged. In general, a paint is reduced to a satisfactory viscosity with solvent(s), and is then applied or propelled onto the surface of the end product. Solvent is then allowed to evaporate into the air at point of application and also in bake ovens used to cure or dry the paint. The pollution resulting from the evaporation of the volatile compounds used as paint solvents has led to the use of expensive solvent collectors and afterburners to reduce this pollution.

The paint industry has developed coatings that have reduced solvent content, but they still do not meet many environmental, performance, or economic requirements. Electrostatic application devices have been designed to develop high transfer efficiencies, however, the solvent has to be discharged in ovens, if not in a spray booth.

Heat-vacuum application of decals, woodgrain prints, signing, etc. has been common practice in the art. The conventional practice involves the contact placing of a film article, coated with a heat-activatable adhesive, onto an application surface or workpiece.

Among the problems experienced by the industry or cited in the art, are:

(1) composites that can't be applied to three dimensional contours without the bubbles and wrinkles caused by pre-adhesion;

(2) solvent emissions at component assembly sites;

(3) finished coatings that are not sufficiently durable and impact-resistant; and (4) adhesives having poor adhesive performance under varying environmental conditions.

U.S. Pat. No. 4,263,077 (Rampelberg) discloses "an in-press method for applying a painted surface to a piece of hardboard or fiberboard while the board is being formed in a press", wherein a hardened paint coat comprising abrasion-resistant clear coat, paint layers, and an adherence coat, [phenolic type], on a carrier is placed in a press with exploded fibers (e.g., wood) and compressed under heat and pressure to form a rigid and dense hardboard piece and transfer the hardened paint coat from the carrier to the board. The clear coat and paint layers are sufficiently heat-resistant that "they remain hardened when subjected to board-forming temperatures at least above 400° F." (column 3, lines 57-59 and column 4, lines 27-28) such that they will not thermoplastically deform at temperatures at which the board is formed. Accordingly such paint coats can not be conformed to surfaces such as automotive body parts having nonplanar contours.

U.S. Pat. No. 3,907,974 (Smith) discloses a heat transfer decoration comprising, in sequence, a carrier, a transfer lacquer layer removably adhered thereto, at least one design print layer adhered to the lacquer layer, and a heat-activatable adhesive layer adhered over the design print layer wherein at least one of the transfer lacquer or design print layer contains a cross-linkable resin and a cross-linking agent for cross-linking the resin intralayer, and preferably interlayer, to form a unified adherent decoration resistant to abrasion and chemicals which is preferably thermoset throughout its thickness. Such a decoration would not be expected to provide desired impact resistance, especially at low temperatures.

U.S. Pat. No. 3,928,710 (Arnold et al.) discloses a heat transfer material comprising a polyethylene terephthalate film carrier, an essentially unpigmented thermoplastic layer of hard acrylic resin, and a thermoplastic image layer for transfer to articles such as soft vinyls to which the image layer will adhere. Upon being contacted to a substrate and application of heat, the image layer softens to bond to the surface of the substrate and the clear acrylic layer releases from the carrier, whereupon the carrier may be removed to effect transfer. The reference does not teach that such articles will provide desired impact resistance.

U.S. Pat. No. 4,451,522 (de Vroom) discloses a transferable enamel sheet comprising a carrier film, a release layer, a paint or enamel layer, and a pressure-sensitive type adhesive layer. The formulation of adhesive disclosed therein would not be expected to provide the desired combination of glass transition temperature and tensile modulus necessary to provide desired impact-resistance and broad temperature stability.

U.S. Pat. No. 3,640,791 (Rosenheim) discloses a paint transfer process for automobiles and a transfer article comprising, in sequence, a release liner, a layer of paint releasably adhered thereto and a layer of water-activatable or pressure-sensitive adhesive. This article is generally described in the reference as a patch. The articles disclosed in Rosenheim would typically be difficult to apply to large or contoured surfaces because of the tacky nature of the adhesive would tend to result in undesired preadhesion. Furthermore, the articles disclosed in the reference are not taught to be impact-resistant.

U.S. Pat. No. 4,101,698 (Dunning et al.), discloses a film laminate construction comprising an elastomeric film, such as polyurethane, a reflective layer, and a layer of heat-activatable or pressure-sensitive adhesive on a temporary release carrier, the elastomeric film being in contact with the release carrier. Such laminates are taught to be elastomeric and accordingly are not well-suited for applications where they are stretched when conformed to a surface, e.g., an indented surface, because they would tend to return to their original dimensions and shape, thus tending to shrink, separate, or "pop-off" from the surface.

In International Publication No. WO84/03473 (Boyd), the title of which is "Heat Transfer Pad Decoration and Substrate Therefor", a heat transfer product for a contoured surface is described. The product consists of a polyamide adhesive/release coating on a paper liner, printed with an ink and protected with a clear coat. The polyamide is referred to as an adhesive/-release coating because it releases from the paper when heated and acts as a hot melt adhesive when in contact with a substrate. The transfer is picked up with a hot silicone sponge from the paper and pressed onto the contoured application surface. The polyamide creates a bond and the sponge then releases. The articles disclosed in the reference would not be expected to provide desired broad temperature performance.

In summary, a need exists in the art for a paint composite that can be applied easily and inexpensively and yet will provide a durable protective coating over a range of thermal environments.

SUMMARY OF THE INVENTION

The present invention provides a paint transfer article for application to a substrate to provide a desired colored coating thereon, and also provides methods for making and using such an article. The paint transfer article provided herein may be used to provide a desired colored coating to a substrate such as the surface of an automobile body component, e.g., a fender or trim piece. The coatings provided by the article of the invention are very tough or durable and will withstand ambient weather conditions, including wind, rain, sunlight, and heat, and further provide high impact-resistance such as to withstand damage from flying rocks and road debris that would tend to nick or chip conventional paint finishes. An advantage of such toughness and impact-resistance is that not only does the paint finish of an automobile resist damage better and thus provide a durable, aesthetically appealing appearance, but the underlying substrate is protected, e.g., metal parts are not subjected to moisture and air that would tend to cause such parts to corrode and polymeric or plastic parts are not subjected to potentially damaging ultraviolet radiation. A further advantage of the paint transfer articles disclosed herein is that solvent emissions are concentrated at one location, i.e., the site of manufacture of the transfer articles, thereby making it more economically feasible to control any environmentally detrimental emissions and to recover any solvents employed.

Briefly summarizing, the paint transfer article of the invention comprises: (1) a continuous reinforcing layer having two major surfaces and a sufficiently low glass transition temperature and sufficiently high tensile modulus to withstand damage under moderate pressure or upon impact, e.g., by flying gravel; and (2) a colored layer on a first major surface of the reinforcing layer, wherein the paint transfer article is sufficiently extensible to intimately conform, under heat and pressure if necessary, to the contours of the surface of a substrate. In addition, the paint transfer article should possess sufficient elasticity to withstand the expansion and contraction effects upon the article and substrate to which it is adhered such as caused by changing temperatures. The colored layer is of desired color and finish, and may comprise a colored base stratum of desired color and an overlying protective clear coat. The reinforcing layer may contain a heat-activatable adhesive to fixedly adhere the transfer article to a substrate, or the paint transfer article may further comprise a layer of such an adhesive that is coated upon the second major surface of the reinforcing layer.

The paint transfer articles of the present invention may be applied to desired substrates and intimately conformed to the contours thereof via such techniques as vacuum and thermo-pressure forming with sufficient heating to activate the heat-activatable adhesive to thus securely bond or fixedly adhere the transfer article to the substrate, thereby providing a colored coating thereon.

The present invention further relates to a method of preparing a cold-formed metal compound component comprising (1) fixedly adhering a paint transfer article as defined herein to a metal substrate, typically substantially planar, and (2) cold-forming the substrate to a desired compound shape. The present invention also relates to a cold-formable metal blank comprising a paint transfer article of the invention fixedly adhered to a cold-formable metal substrate. The paint transfer article can be applied to substantially planar metal stock, e.g., placed on the metal stock with the adhesive in contact with the metal, subjected to sufficient heat to activate the adhesive, and allowed to cool to ambient temperature to form the cold-formable blank. The blank can then be cold-formed, e.g., stamped, to form a compound component. It has been found that the paint transfer article of the invention, after being fixedly adhered to a metal substrate, can be cold-formed, e.g., stamped, without a deleterious effect on the dry paint coating or the appearance thereof. This invention accordingly may eliminate the need to form a compound metal part before it is painted.

BRIEF DESCRIPTION OF THE DRAWING

The invention will now be further explained with reference to the drawing, wherein.

These figures, which are not to scale, are idealized and intended to be merely illustrative and nonlimiting.

DETAILED DESCRIPTION OF THE INVENTION

Figure 1:
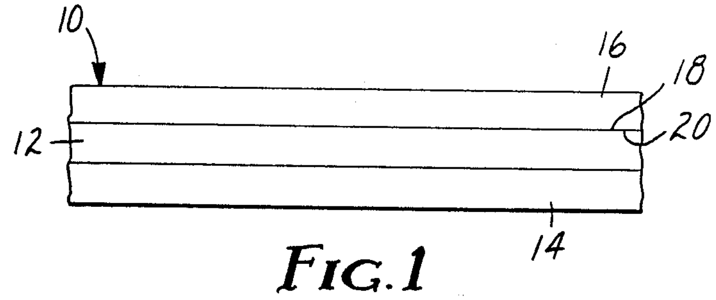
FIG. 1 is an edge view of a portion of one embodiment of the paint transfer article of the present invention.

The paint transfer articles of the present invention comprise: (1) a continuous reinforcing layer having two major surfaces and a sufficiently low glass transition temperature and sufficiently high tensile modulus to withstand impact without damage, and (2) a colored layer on a first major surface of the reinforcing layer, wherein the paint transfer article is sufficiently extensible to intimately conform, under heat and pressure if necessary, to the contours of the surface of a substrate. FIG. 1 illustrates an embodiment of such a paint transfer article 10 comprising colored layer 12 and reinforcing layer 14 on carrier 16.

Carrier 16 may function as a temporary support on which to form colored layer 12 and reinforcing layer 14. For instance, paint transfer article 10 may be formed by applying a coating composition or compositions of desired color onto carrier 16, and drying or curing as necessary to form colored layer 12. Thus, carrier 16 should be chemically resistant to withstand exposure to the solvents and other components of the coating composition substantially without degradation. Also, carrier 16 should be dimensionally stable and resist changing shape and/or dimension at least up to the temperatures at which the coating composition may be heated to form colored layer 12. Furthermore, during manufacture of paint transfer article 10, the composite may be drawn through a sequential series of processing stations, e.g., application then curing of coating compositions, and application of reinforcing layer 14, thus carrier 16 should possess sufficient tensile strength to support the assembly during these operations and to draw the assembly through same. Preferably, carrier 10 will possess sufficiently high tensile strength so as to undergo at most minimal extension under the conditions it is subjected to during manufacture of the transfer article. For instance, a suitable carrier may have a tensile strength of at least about 2 pounds/inch-width and an extensibility of less than 5 percent in response to a tensile force of about 1 pound/inch-width at 250° F.

If colored layer 12 is formed on carrier 16, the properties of surface 18 of colored layer 12 will be defined in part by the nature of major surface 20 of carrier 16. Therefore, it will typically be preferred that major surface 20 of carrier 16 have a substantially uniform texture of gloss, thereby imparting similar characteristics to surface 18 of colored layer 12. Major surface 20 of carrier 16 will preferably have a substantially uniform surface energy such that the coating composition from which colored layer 12 is formed will substantially uniformly wet out major surface 20. Also, the surface energy of major surface 20 of carrier 16 is preferably such that colored layer 12 will easily and uniformly release therefrom without damaging surface 18 of colored layer 12. Such release may be performed prior to application of paint transfer article 10 to a substrate (not shown) and preferably can be achieved without application, or with application of only minimal amounts, of heat.

Examples of suitable carriers include films or sheets of such polymeric materials as polycarbonate, uniaxially- or biaxially-oriented polypropylene, and biaxially-oriented polyethylene terephthalate. The surfaces of such materials may inherently have the desired properties described above, or the surface of the carrier may be treated to provide the necessary properties, e.g., application of a release coating thereto prior to application of the coating composition form which the colored layer is formed.

Figure 4A:
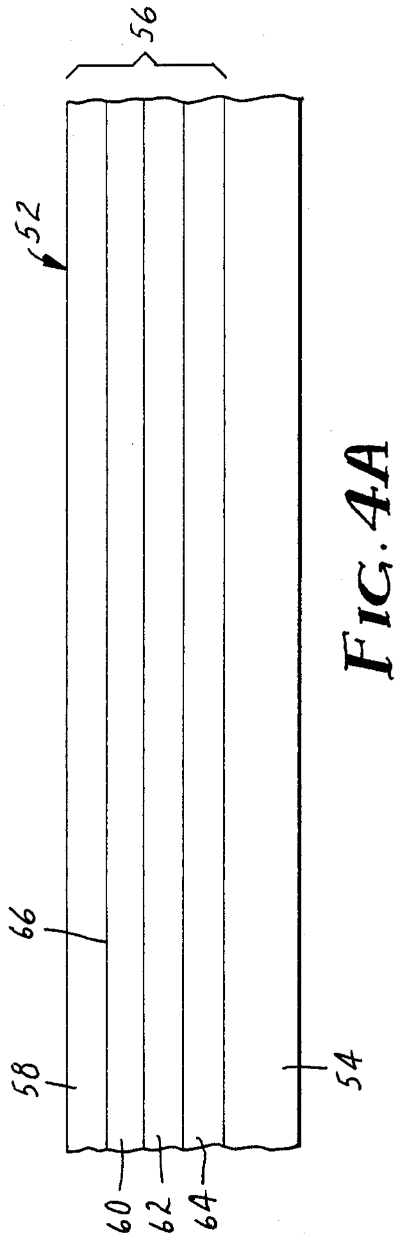
FIG. 4A is an edge view of a portion of a cold-formable blank of the present invention.
Figure 4B:
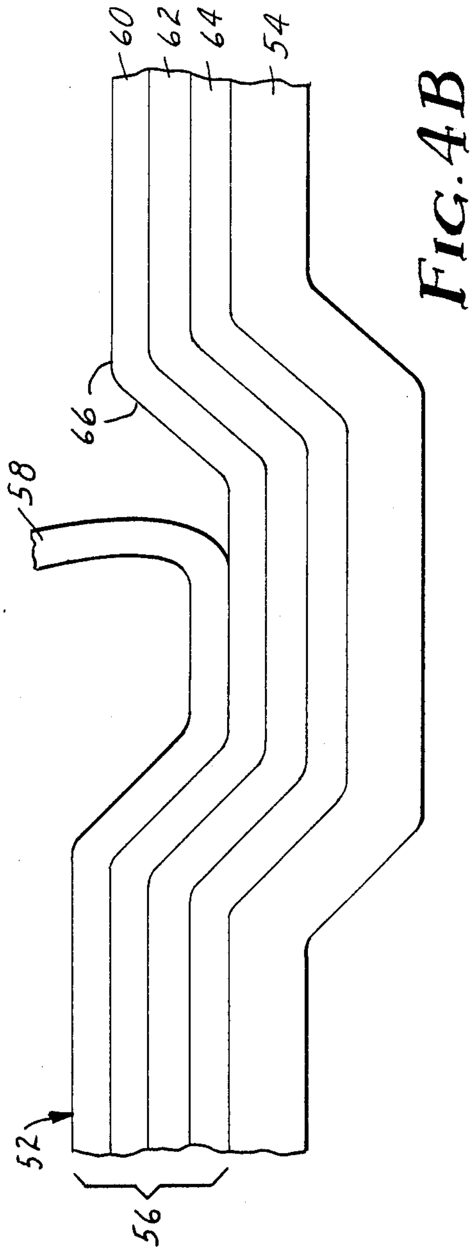
FIG. 4B is an edge view of a portion of the blank of FIG. 4A after cold-forming.

In some applications the carrier will remain on the paint transfer article during the application of the transfer article to a substrate. In such instances, the carrier should be sufficiently flexible and extensible to conform intimately to the contours of the substrate. The flexibility and extensibility of the carrier may typically be increased by application of heat. The carrier may then be removed before or after application of sufficient heat to activate the adhesive and fixedly adhere the paint transfer article to the substrate. If the substrate is to be cold formed, e.g., by stamping, after application of the paint transfer article to the surface thereof, the carrier may be left on the colored layer until after the cold working is completed. If it is to be used as a protective member in this fashion, the carrier should withstand the heat required to activate the adhesive without substantial degradation or tending to bond firmly to or otherwise undesirably reacting with the colored layer. It should also be capable of withstanding the impact and pressure to which it is subjected by the cold forming equipment, e.g., stamping dies, while similarly retaining its desired properties. Such an embodiment is illustrated in FIGS. 4*a* and 4*b*.

The paint transfer articles of the invention should be sufficiently extensible to intimately conform, under heat and pressure if necessary, to the contours of the surface of the substrate to which it is to be applied, substantially without aesthetic or structural degradation. For instance, materials that are insufficiently extensible may tend to stress-whiten (such as employed in some labeling strips) or even split or crack if stretched excessively. Thus, the paint transfer articles of the invention should have an extensibility of at least 10 percent, preferably at least 50 percent, and most preferably at least 100 percent. The extensibility of the paint transfer article typically may be enhanced by provision of thicker layers as described herein and/or by utilizing component materials that inherently tend to be more highly extensible. Furthermore, the paint transfer articles should possess sufficient elasticity to withstand the expansion and contraction effects upon the article and substrate to which it is applied as caused by changes in temperature of the environments to which they are exposed. Also, the paint transfer articles of the invention are preferably substantially nonelastomeric, i.e., have a low tendency to return to their original dimensions after being stretched, such that they will not tend to delaminate from a surface after being applied thereto.

Figure 2:
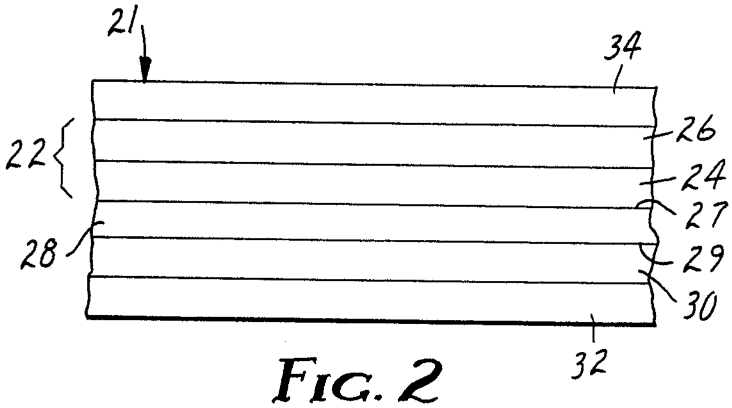
FIG. 2 is an edge view of a portion of a second embodiment of the paint transfer article of the present invention.

Colored layer 12 of the paint transfer article is a layer of material of the desired color, e.g., blue or red, or a metallic appearance. As shown in FIG. 2, colored layer 22 is typically preferably made up of colored base stratum 24 and clear coat 26.

Base stratum 24, which is typically at least about 1.0 mil (0.03 millimeter) thick, may comprise one or more layers of paint or similar composition having the desired color and which form a film having sufficient extensibility as part of paint transfer article 10 to be conformed to the contour of the surface of a substrate. We have found that the extensibility of many paints is higher when such materials are used as part of a paint transfer article such as disclosed herein than the extensibility of films of similar thickness of the same materials possess alone. In addition, additives such as long chain polymers may be incorporated in some paint compositions to improve the extensibility of paint transfer articles comprising same. For instance, some paint materials that have an extensibility on the order of only 5 percent when formed alone in a film, may be used to make a paint transfer article of the invention having an extensibility of 75 percent or more.

Examples of suitable coating compositions from which a suitable base layer can be formed include commercially available autobody paints. For instance, the IMRON Series of paints, available from DuPont, may be used herein. Modified-melamine urethanes, such as the DURATHANE Series, available from PPG Industries, Inc., have been found useful for paint transfer articles that are stretched while at room temperature, i.e., articles that are cold-formed such as by stamping. Two part urethanes, i.e., polyols such as pigmented versions of BASF-Inmont 410CD214 Clear reacted with diisocyanates such as DESMODUR Z-4370, available from Mobay Chemical Co., may be used in articles which are stretched at room temperature and are typically preferred for applications where the paint transfer article is to be stretched while hot, such as thermoforming. A preferred formulation based thereon comprises stoichiometric excess of the diisocyanate Z-4370 relative to the polyol 410CD214, i.e., in about a 1.1:1.0 NCO to OH ratio, and further comprises about 1 equivalent part of long chain aliphatic urethane, such as DESMODUR N-751 (biuret of hexamethylene diisocyanate, available from Mobay Chemical Co.), for every 9 equivalent parts of DESMODUR Z-4370.

Optional clear coat 26, which is typically at least about 1.0 mil (0.03 millimeter) thick, is used to impart an appearance of depth, and in certain cases, to protect the sub-layers, i.e., base stratum 24 and reinforcing layer 28, from degradation caused by, e.g., acid rain, ultraviolet light, general weathering, and other environmental conditions, and is typically essentially transparent. Clear coat 26 should be formulated to: (1) be compatible with base stratum 24, i.e., bond thereto in essentially inseparable fashion; (2) release or adhere to the carrier, dependent upon the type of application; (3) dry or cross-link at an energy level, i.e., temperature, below that at which carrier may become dimensionally unstable; and (4) elongate at the forming temperature without stress cracking or rupture, and then perform in this state of elongation, according to the particular application requirements, after paint transfer article 21 is fixedly adhered to a substrate (not shown).

Examples of suitable clear coats include melamine-modified polyurethane lacquers, such as that sold under the tradename HCC-1000 Elastomeric Enamel by PPG Industries, Inc., and two-part polyurethanes, such as BASF-Inmont 410CD214 Clear reacted with a diisocyanate and long chain aliphatic urethane.

In some instances, the clear coat will serve as a carrier during manufacture of the paint transfer article, i.e., will be used as a coating surface and support upon which the other layers of the paint transfer article, e.g., colored base stratum and reinforcing layer, are formed. Examples of materials that may be used in such clear coats include polycarbonates.

The critical requirement of the reinforcing layer, which is typically at least about 0.5 mil (0.02 millimeter) thick, is to resist damage to itself or the colored layer on impact or under moderate pressure tending to dent or deform same. For instance, an automobile may be subjected to the impact of flying debris such as gravel, or objects may be leaned thereagainst, e.g., bicycles, or placed thereon, e.g., briefcases or packages. Thus, the reinforcing layer should be in a resilient, rubbery state under essentially all expected ambient conditions and possess sufficient internal strength under those conditions to support the colored layer and resist damage to the colored layer or itself.

We have found, that in order for the paint transfer article, after application to a substrate, e.g., an automobile body part, to withstand impact and penetration by stones or other objects, and to resist marring or gouging under moderate pressure or creeping in response to gravity, the reinforcing layer typically should have a glass transition temperature ($T_g$) of 20° C. or below, and a tensile modulus of at least about 50 pounds/inch$^2$ at about 200° F. (350 kilo-Pascals at 95° C.). The impact resistance of the paint transfer article, particularly at colder temperatures such as may be encountered during winter, typically tends to improve as the glass transition temperature of the reinforcing layer is lowered, thus the glass transition temperature of the reinforcing layer is preferably below about −10° C., and more preferably below about −25° C. The mar- or gouge-resistance of the paint transfer article typically tends to improve as the tensile modulus of the reinforcing layer increases, thus the tensile modulus of the reinforcing layer is preferably at least about 200 psi at 200° F. (1400 kPa at 95° C.), and more preferably at least about 2000 psi at 200° F. (14,000 kPa at 95° C.).

In the embodiment shown in FIG. 1, the reinforcing layer also acts as the adhesive means by which the paint transfer article is adhered to the substrate. In such embodiments the reinforcing layer comprises a heat-activatable adhesive. Examples of suitable adhesives having the desired glass transition temperature and tensile modulus include QUINN 4820, an aliphatic polyurethane thermoplastic elastomer, available from K. J. Quinn Co., and BOSTIK 7906, a polyester-based adhesive available from the Bostik Division of Emhart Corp. Particularly preferred is the aliphatic linear polyurethane elastomer available from Mobay as DESMOLAC 4125.

As an adhesive agent, the reinforcing layer preferably: (1) provides a secure, durable bond to the desired substrate; (2) resists discoloration during application to the substrate that might tend to undesirably affect the coloration or appearance of the colored layer; (3) is substantially tack-free before activation to permit windup and storage without rollblocking, to resist pickup of dirt and undesired matter, and to resist pre-adhesion to other objects or the substrate; and, typically, (4) has an activation temperature that is higher than the temperature that may be required to intimately conform and contact the article to the surface of the substrate.

Alternatively, the paint transfer articles of the present invention may comprise an optional layer of heat-activated adhesive, typically at least about 0.5 mil (0.02 millimeter) thick, on the second major surface of the reinforcing layer. Such an embodiment is illustrated in FIG. 2 wherein is shown paint transfer article 21 comprising colored layer 22 on first major surface 27 of reinforcing layer 28 and optional adhesive layer 30 of second major surface 29 of reinforcing layer 28. Adhesive layer 30 may be protected by optional liner 32, however, many useful adhesives are sufficiently dry and tack-free as to not require such a liner to prevent dirt pickup and contamination, and roll-blocking if paint transfer article 21 is stored in roll form. Liner 32 is removed precedent to application of paint transfer article 21 to a substrate.

In such embodiments, reinforcing layer 28 is preferably essentially inseparably bonded to both colored layer 22 and adhesive layer 30, and may comprise any of the types of adhesives described above with reference to FIG. 1, or may comprise a material having the desired glass transition temperature and tensile modulus but which is substantially not heat-activatably adhesive in nature. Interfacial bonding between layers of the paint transfer article of the invention, e.g., between reinforcing layer 28 and adhesive layer 30 or colored layer 22 may be improved by priming in some instances. Alternatively, during manufacture of the paint transfer article, the various layers may be partially cured as they are sequentially formed, and then fully cured in situ after all the layers are assembled to provide strong hands therebetween.

An advantage of embodiments that comprise both reinforcing layer 28 and adhesive layer 30 is that reinforcing layer 28 may be formulated with particular attention to its desired glass transition temperature and tensile modulus without the concurrent requirement that it also be heat-activatably adhesive in nature. Similarly, because adhesive layer 30 may have a glass transition temperature and tensile modulus outside the ranges for such properties which are desired for the reinforcing layer, an adhesive for use in such a layer may be formulated with particular attention to its heat-activation temperature, the types of substrates to which bonding is desired, and the environmental conditions the bond should withstand.

Paint transfer articles of the invention may be made for application to a variety of surfaces, including those made of metal, polymeric materials (including plastics and rubbers), glass, or wood. Formulation or selection of the appropriate reinforcing layer or adhesive layer for securely bonding thereto is made accordingly. For instance, the heat-activation temperature for an adhesive used to apply a paint transfer article to a metal substrate might be as high as at least 150° C. whereas the heat-activation temperature for an adhesive used with polymeric materials might be at least 100° C., which would typically ensure environmental stability yet be safe for relatively more heat-sensitive materials.

Referring again to FIG. 1, paint transfer article 10 of the invention may be made by applying a suitable coating composition onto carrier 16 and at least partially drying or curing the coating composition, depending upon the particular nature thereof, to form colored layer 12. Depending upon the nature of the materials used, such coating composition may be applied by such known techniques as spraying, coating, casting, etc. If colored layer 12 is to comprise more than one layer, for instance such as colored layer 22 of FIG. 2, the layers will typically be individually applied and at least partially dried or cured in the proper sequence. Reinforcing layer 14 is then applied thereto, e.g., by coating, casting, extruding, or as a preformed film, depending in part upon the nature of the material used. If, as illustrated in FIG. 2, the paint transfer article is to also comprise optional adhesive layer 30, such a layer is then applied to second major surface 29 of reinforcing layer 28, e.g., by coating, casting, extruding, or as a preformed film.

Alternatively, the paint transfer articles of the invention may be made in the reverse sequence. With reference again to FIG. 2, liner 32 may be used as a temporary support upon which to form paint transfer article 21 by application, in order, of optional adhesive layer 30, reinforcing layer 28, and colored layer 22. Finally, optional carrier 34 may be applied for use in application of paint transfer article 21 to a substrate. Such a sequence of manufacture may be preferred such as where base stratum 24 comprises metallic flakes in which case proper leafing of the metallic flakes for the desired appearance is more easily achieved by spraying the composition onto reinforcing layer 28.

Application of a paint transfer article of the present invention to a substrate such as the surface of an autobody component may be achieved by such techniques as vacuum application, thermo-pressure forming, injection molding, etc. wherein the article is intimately conformed and contacted to the contour of the substrate's surface, and the adhesive of the reinforcing layer or adhesive layer is heat-activated to fixedly adhere the paint transfer article to the surface. The parameters for determining suitability of an application technique will be determined in part by such factors as the nature of the substrate, including its shape and composition, and the heat-activation temperature required for the paint transfer article to achieve a secure bond to the substrate. Typically, it will be preferred that the paint transfer article be substantially free of volatile components such that it will intimately conform to the surface of the substrate without blistering or bubbling. U.S. Pat. No. 3,818,823 (Bond) discloses one example of a technique and apparatus which may be useful for application of paint transfer articles of the invention to a substrate.

Figure 3:
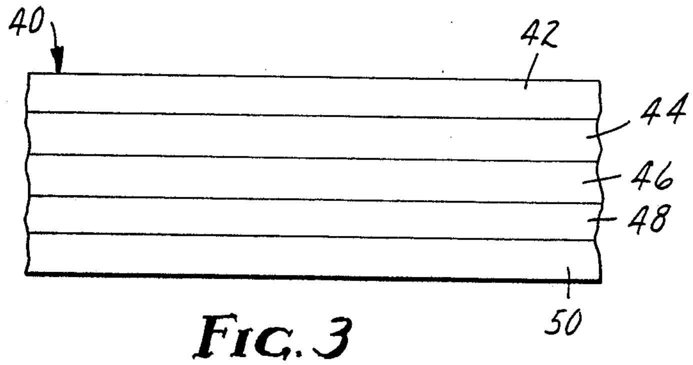
FIG. 3 is an edge view of a portion of a third embodiment of the paint transfer article of the invention.

FIG. 3 illustrates another embodiment of the present invention wherein paint transfer article 40 comprises colored layer 42, reinforcing layer 44, secondary reinforcing layer 46, and adhesive 48 which is covered by optional protective liner 50. Reinforcing layer 44 has the same purpose and properties, i.e., glass transition temperature and tensile modulus, as described above. Secondary reinforcing layer 46 may be used to provide greater strength and body to paint transfer article 40, particularly during the manufacture thereof, and should be sufficiently flexible and have sufficient elongation to intimately conform to the surface of the substrate to which paint transfer article 40 is applied. However, secondary reinforcing layer 46 need not meet the glass transition temperature and tensile modulus requirements for reinforcing layer 44. Advantageously, secondary reinforcing layer 46 may be used as the base member to which the other constituent components of the article are subsequently applied to form paint transfer article 40. Examples of suitable materials for use in secondary reinforcing layer 46 include sheets or films of vinyl such as polyvinyl chloride, polyolefins such as polyethylene or copolymers thereof, and polyester.

As mentioned above, a paint transfer article of the present invention may be applied to a metal substrate that is then cold-formed, e.g., stamped, to the desired shape, thereby eliminating the need to form some parts before applying desired color to same. FIG. 4A illustrates cold-formable blank 52 comprising metal substrate 54 to which paint transfer article 56 (comprising carrier 58, colored layer 60, reinforcing layer 62, and adhesive layer 64) has been applied. Cold-formable blank 52 may be stamped to provide a desired shape such as the indentation shown in FIG. 4B. Carrier 58 is typically left in place to protect surface 66 of colored layer 60 during forming, and then removed as shown in FIG. 4B.

The present invention will now be further explained by the following illustrative examples. Unless otherwise indicated, all amounts are expressed in parts by weight.

EXAMPLE 1

A 4 mil (0.1 millimeter) thick biaxially-oriented polyethylene terephthalate film, SCOTCHPAR Brand Polyester Film, available from Minnesota Mining and Manufacturing Company ("3M"), was used as the carrier. The film was of uniformly high gloss, had a substantially uniform caliper, and contained an aluminum silicate slip agent to provide subsequent release of the paint transfer article therefrom.

HCC-1000 Elastomeric Enamel, a substantially clear melamine-modified polyurethane lacquer, available from PPG Industries, Inc., was coated on the carrier with a conventional bar coater through a 6 mil (1.5 millimeter) orifice. The assembly was then pulled through a conventional convection oven where it was heated at about 200° F. (95° C.) for a short period to evaporate initial solvent, and then heated at about 250° F. (120° C.) for approximately 10 minutes to partially cure the clear coat. Upon exit from the oven, the assembly was allowed to cool to about room temperature, achieving a substantially tack free state, and wound upon a core.

HSE-8536 Silver Metallic Paint, a pigmented paint of the DURATHANE 700 Series, available from PPG Industries, Inc., was coated over the previously formed clear coat and dried in the same fashion to provide the colored base stratum and complete the colored layer.

DESMOLAC 4125, a polyurethane adhesive, available from Mobay Chemical, Inc., was coated over the colored layer with the same bar coater and setting. The assembly was dried at about 250° F. (120° C.) for approximately 20 minutes to form a reinforcing layer and complete the paint transfer article, and the assembly then wound upon itself into roll form.

A portion of the rolled product was cut from the roll, the carrier removed therefrom, and the paint transfer article laid, reinforcing layer down, on a metal part having a contoured surface, the paint transfer article and metal part being situated on the platen of a heat vacuum applicator Model HVA 2, formerly available from 3M.

The HVA 2 Applicator comprises a hinged frame mounted to the platen that supports a silicone rubber diaphragm on all four sides. During application, a vacuum was drawn on the part and paint transfer article while initially holding the diaphragm therefrom. The diaphragm was then gradually released so that it first contacted the part near the center of the surface thereof. The diaphragm then engulfed the part, forcing the paint transfer article to intimately conform to the contour of the surface of the part.

The assembly, paint transfer article, metal part, and diaphragm, was then hated with radiant heat lamps to a thermostatically-controlled cut off point of about 320° F. (160° C.). The sample was then cooled while under vacuum tension to prevent contractive tensile relaxation forces from disturbing the developing adhesive bond.

After removal from the /applicator, the SCOTCHPAR liner was removed, and the finished part was examined and found to have a uniform paint coating having a high gloss finish adhered to thereto. The paint transfer article had conformed to the contours of the surface.

EXAMPLE 2

The experiment of Example 1 was repeated, except the clear coat comprised DESMODUR N-75 reacted with a 50/50 blend by solids, of DESMOPHEN 670-90 and DESMOPHEN 651-A65, at a NCO to OH ratio of 1.1:1.0. All three components are sold by Mobay Chemical Company. Similar results were achieved as in Example 1.

EXAMPLE 3

Example 1 was repeated, except the clear coat was omitted and the pigmented paint coating coated directly on the carrier. The resultant paint transfer article was applied to a part as in Example 1 with similar results being achieved.

EXAMPLE 4

Polycarbonate film, 3 mils (0.08 millimeter) thick, identified as 880-112 by General Electric Corporation, was coated with HSE-8536 Silver Metallic Paint and DESMOLAC 4125 as in Example 1. The composite was applied as in Example and conformed to the contours of the surface. The polycarbonate film in this example was bonded to the coatings and remained a part of the paint transfer article.

EXAMPLES 5-8

Examples 5-8 illustrate the result obtained with paint transfer articles made with different reinforcing layers. The paint transfer article of Example 5 was made as in Example 1. The articles of Example 6-8 were made in the same fashion using the same materials except the following adhesives were used as the reinforcing layers therein: in Example 6, BOSTIK 7906 was used; in Example 7, DuPont 68070 Adhesive, an acrylic adhesive available from DuPont was used; and in Example 8, an adhesive formulation comprising a terpolymer of isobutyl acrylate, butyl acrylate, and acrylic acid (65/25/10 weight ratio) was used.

Shear creep tests were conducted as follows. Paint transfer articles of each Example were cut into 2 inch by 0.5 inch (5 centimeter by 1.2 centimeter) strips and applied with a Hix Press under heat and pressure to UNIPRIME-coated steel panels, available from Advanced Coating Technologies, with 0.5 by 0.5 inch (1.2 by 1.2 centimeter) portions of each strip being adhered to the panel and the remaining portion of the strip extending beyond. The carriers were left on the paint transfer articles. A 1000 gram weight was attached to the extended tail of each strip, which assembly was then placed in an oven at the indicated temperature in a vertical orientation with the weight suspended therefrom. The time of failure for each paint transfer article (i.e., the time elapsed when the strip had totally creeped off the panel) was noted. The results were as follows:

TABLE 1

| Example | Adhesive | Tensile Modulus[1] (psi/kPa) | Temp. (°F./°C.) | Time |
|---|---|---|---|---|
| 5 | DESMOLAC 4125 | 2300/16,000 | 80/27 | NF[3] |
| | | | 200/95 | NF[3] |
| | | | 300/150 | 4.4 |
| 6 | BOSTIK 7906 | 145/1000[2] | 80/27 | NF[3] |
| | | | 200/95 | NF[3] |
| | | | 300/150 | 0.1 |
| 7 | DUPONT 68070 | 90/630 | 80/27 | NF[3] |
| | | | 200/95 | NF[3] |
| | | | 300/150 | 0.75 |
| 8 | Terpolymer | 90/630 | 80/27 | NF[3] |
| | | | 200/95 | NF[3] |
| | | | 300/150 | NF[4] |

[1]At 200° F. (95° C.) unless otherwise indicated.
[2]At 160° F. (70° C.).
[3]No Failure after 168 hours.
[4]No Failure after 24 hours.

180° peel adhesion tests were performed by applying strips of each paint transfer article of the same dimensions as those used in the sheer creep test to similar steel panels and to reaction-injection-molded (RIM) polyurethane panels available from Mobay Chemical Corp. The strips were then tested with an Instron to determine the 180° peel adhesion. The results were as follows:

TABLE II

| Example | Adhesive | Substrate Panel | 180° Peel Adhesion (pound/ inch-width) |
|---|---|---|---|
| 5 | DESMOLAC 4125 | Steel | 8.0 |
| | | RIM | 4.5 |
| 6 | BOSTIK 7906 | Steel | 0.4 |
| | | RIM | 5.5 |
| 7 | DUPONT 68070 | Steel | 10.0 |
| | | RIM | 9.0 |
| 8 | Terpolymer | Steel | 0.4 |
| | | RIM | 1.0 |

Finally, strips of each paint transfer article were applied to steel panels and Gravelometer tests run at −20° F. (−11° C.). The samples were then examined and rated according to the Society of Automotive Engineering J400 Chip Rating Standards (wherein the sizes of the chips are rated on a scale of A to D with A being smallest and D being largest, and the frequency of the chips is rated on a scale of 9 to 0 with 9 being the least frequent and 0 being most frequent). The results were as follows:

TABLE III

| Example | Adhesive | $T_g$ | Rating |
|---|---|---|---|
| 5 | DESMOLAC 4125 | −28° C. | 4A |
| 6 | BOSTIK 7906 | +11° C. | 6C |
| 7 | DUPONT 68070 | +42° C. | 7C |
| 8 | Terpolymer | +42° C. | 4C |

DESMOLAC 4125 was felt to offer the optimum performance, in that it provided good resistance to sheer creep, strong adhesion to both the UNIPRIME-coated steel and RIM panels, and very good chip rating.

EXAMPLE 9

A layer of HCC-1000 was coated on a carrier as in Example 1 and cured for 5 minutes at about 250° F. (120° C.) to form a clear coat. A layer of SERIES 700 Canyon Red Automotive Paint, available from PPG Industries, Inc., was coated on the clear coat and cured for about 5 minutes at 250° F. (120° C.). A layer of DESMOLAC 4125 was then coated over the paint and cured for 30 minutes at about 250° F. (120° C.) to complete the paint transfer article.

Samples of this paint transfer article were cut to size and applied to UNIPRIME-coated steel panels like those described in Examples 5–8 using a Hix Press set at about 320° to 340° F. (160° to 170° C.) for about 30 seconds.

These panels were then cold stamped to introduce corrugations of three different sizes:

(1) 1.0 inch across, $\frac{1}{4}$ inch deep;

(2) 13/16 inch across, 3/16 inch deep; and (3) $\frac{3}{4}$ inch across, $\frac{1}{8}$ inch deep, with the carrier left on to protect the finish of the paint transfer article from machine oils and abrasion. After removal of the carrier, each panel was observed to have a glossy finish with no apparent degradation from the stamping such as cracking or splitting.

A set of similar steel panels were spray painted with Canyon Red paint in normal fashion. After these panels were stamped, cracks were observed along the edges of the largest corrugations.

The panels were then subjected to Gardner Impact testing at room temperature, and withstood the maximum indentation of 160 inch-pounds without visible failure (i.e., cracking or flaking of paint). Duplicate samples were then subjected to Gardner Impact testing at −20° F. (−11° C.) with a unit having a maximum rated capacity of 80 inch-pounds and a lesser curvature than the first impact tester. Again, the panels withstood the maximum indentation without visible failure.

COMPARATIVE EXAMPLE A

A set of steel panels as used in Example 9 were spray painted with the Canyon Red paint in normal fashion. These panels were then stamped as in Example 9, suffering cracks along the edges of the largest indentations.

When subjected to Gardner Impact testing as in Example 9, the panels failed at 40 inch-pounds at room temperature and at 25 inch-pounds at −20° F. (−11° C.).

EXAMPLE 10

A 3.5 mil (0.09 millimeter) thick biaxially-oriented polypropylene film, TX-350, available from Trea, Inc. was used as a carrier. A clear coat composition (48.3 parts BASF-Inmont 410CD214, 47.8 parts DESMODUR Z-4370, and 4.0 parts DESMODUR N-751) was coated with a knife coater at a wet thickness of about 5 mils (0.12 millimeter) on the carrier and partially cured for 5 minutes at 150° F. (65° C.) and then 10 minutes at 235° F. (110° C.).

A white paint coating (72.7 parts BASF-Inmont 7L393119, 24.2 parts Z-4370, and 2.1 parts N-751) was coated onto the clear coat and partially cured in the same fashion.

A layer of DESMOLAC 4125 was then coated onto the white layer in the same fashion, partially cured at 150° F. (65° C.) for 5 minutes and at 235° F. (110° C.) for 30 minutes to form the reinforcing layer.

A layer of PM 3876, a Buna N phenolic adhesive having a $T_g$ of +33° C. and a tensile modulus of about 200 pounds/inch$^2$ at 200° F. (1600 kPa at 95° C.), available from 3M, was then coated over the reinforcing layer to a wet thickness of about 5 mils (0.12 millimeter) and dried to remove the solvents therefrom to complete the paint transfer article.

The paint transfer article was found to have the following properties:

Tensile Modulus: 3240 pounds/inch$^2$

Elongation: 80 percent

Yield point: 15.0 pounds/inch width at 3 percent elongation

The paint transfer article was then applied to a UNIPRIME-coated steel panel with a Hix press as in Examples 5–8.

When tested with the Gravelometer as in Examples 5–8, the paint transfer article achieved an excellent rating of 9A. The test panels were then placed in a continuous salt spray solution (4 percent by weight) according to ASTM B117-73. After 1000 hours the portions of the panels to which the paint transfer article had been applied still had an excellent appearance with essentially no rust spots being observed, whereas the uncovered portions of the primed panels were observed to have suffered substantial corrosion.

Various modifications and alterations of this invention will become apparent to those skilled in the art without departing from the scope and spirit of this invention.

What is claimed is:

1. A paint transfer article comprising:

(A) a continuous reinforcing layer, said layer having two major surfaces and having a glass transition temperature below about 20° C. and a tensile modulus of at least about 50 pounds/inch$^2$ at 200° F.; and (B) a colored layer on a first major surface of said reinforcing layer;

wherein said paint transfer article is substantially non-elastomeric and sufficiently extensible to intimately conform to the contours of the surface of a substrate.

2. The paint transfer article of claim 1 wherein said colored layer comprises a substantially clear coating over a colored base stratum.

3. The paint transfer article of claim 2 wherein said clear coating comprises an ultraviolet protective agent.

4. The paint transfer article of claim 1 wherein said glass transition temperature is below about −10° C.

5. The paint transfer article of claim 1 wherein said glass transition temperature is below about −25° C.

6. The paint transfer article of claim 1 wherein said tensile modulus is at least about 200 pounds/inch$^2$ at 200° F.

7. The paint transfer article of claim 1 wherein said article has an extensibility of at least 10 percent.

8. The paint transfer article of claim 1 wherein said article has an extensibility of at least 50 percent.

9. The paint transfer article of claim 1 wherein said article has an extensibility of at least 100 percent.

10. The paint transfer article of claim 1 wherein said article is vacuum formable.

11. The paint transfer article of claim 1 wherein article is thermo-pressure formable.

12. The paint transfer article of claim 1 wherein said article is substantially free of volatile components.

13. A cold-formable metal blank comprising:

(A) a substantially planar metal substrate having at least one major surface; and (B) the paint transfer article of claim 1 fixedly adhered to said surface.

14. The paint transfer article of claim 1 wherein said tensile modulus is at least about 2000 pounds/inch$^2$ at 200° F.

15. The paint transfer article of claim 14 wherein said glass transition temperature is below about −25° C.

16. The paint transfer article of claim 1 wherein said reinforcing layer contains a heat-activatable adhesive.

17. The paint transfer article of claim 16 wherein said adhesive comprises an aliphatic polyurethane elastomer.

18. The paint transfer article of claim 16 wherein the heat-activation temperature of said adhesive is at least 100° C.

19. The paint transfer article of claim 16 wherein said heat-activation temperature is at least 150° C.

20. The paint transfer article of claim 1 further comprising a carrier having at least one major surface, said major surface being in contact with said colored layer.

21. The paint transfer article of claim 20 wherein said major surface of said carrier has substantially uniform texture and gloss.

22. The paint transfer article of claim 20 wherein said major surface of said carrier has substantially uniform surface energy.

23. The paint transfer article of claim 20 wherein said carrier has a tensile strength of at least about 2 pounds/inch-width and an extensibility of less than 5 percent in response to a tensile force of about 1 pound/inch-width at 250° F.

24. The paint transfer article of claim 20 wherein said carrier comprises at least one of the following: polycarbonate, uniaxially-oriented polypropylene, biaxially-oriented polypropylene, or biaxially-oriented polyethylene terephthalate.

25. The paint transfer article of claim 1 further comprising a continuous layer of adhesive on the second major surface of said reinforcing layer, said adhesive being heat-activatable.

26. The paint transfer article of claim 25 further comprising a protective liner in contact with said layer of adhesive.

* * * * *